United States Patent [19]
Bohner et al.

[11] Patent Number: 6,095,277
[45] Date of Patent: Aug. 1, 2000

[54] VEHICLE STEERING SYSTEM

[75] Inventors: Hubert Bohner, Boeblingen; Martin Moser, Fellbach, both of Germany

[73] Assignee: DaimlerChrysler AG, Stuttgart, Germany

[21] Appl. No.: 08/985,963

[22] Filed: Dec. 5, 1997

[30] Foreign Application Priority Data

Dec. 5, 1996 [DE] Germany ................ 196 50 475

[51] Int. Cl.⁷ ...................................... B62D 5/06
[52] U.S. Cl. ................................................. 180/403
[58] Field of Search ........................ 180/402, 403, 180/422, 421

[56] References Cited

FOREIGN PATENT DOCUMENTS

| 0 716 948 | 6/1996 | European Pat. Off. . |
| 2 030 094 | 4/1980 | United Kingdom . |
| 2 266 499 | 11/1993 | United Kingdom . |

*Primary Examiner*—Kevin Hurley
*Assistant Examiner*—Andrew J. Fischer
*Attorney, Agent, or Firm*—Evenson, McKeown, Edwards & Lenahan, P.L.L.C.

[57] ABSTRACT

A vehicle steering system that senses forces acting upon steered vehicle wheels to enable a control device to record introductions of disturbance variables from the road through the steered vehicle wheels without any time delay, and examine its plausibility by means of other input quantities. This permits a multi-redundant system, where the redundant signals or the redundant information determined from the signals originate from differently structured and arranged sensors. There is also the advantageous possibility that, as a function of forces active on the steered vehicles wheels, the control device controls or influences a manual force actuator without delay. This has the purpose of simulating or modulating, as a function of the respective driving conditions, an actuating force on the manual steering device or on the manual steering wheel which can be felt by the driver.

9 Claims, 2 Drawing Sheets

VEHICLE STEERING SYSTEM

BACKGROUND AND SUMMARY OF THE INVENTION

The invention relates to a vehicle steering system having a manual steering device, particularly a driver operated manual steering wheel, as well as a motor-driven actuating unit which is assigned to the steered vehicle wheels. The manual steering device is operatively connected by way of a control system whose control device is, on the one hand, for the purpose of obtaining a desired-value actual-value comparison, connected on the input side to a desired value generator operated by the manual steering device and to an actual value generator recording the steering angle of the steered vehicle wheels. On the other hand, the manual steering device is operatively connected on its input side with sensors for detecting forces in the vehicle steering system.

Currently, passenger cars and similar motor vehicles are, as a rule, equipped with hydraulic power steering systems. In this case, the manual steering wheel is mechanically coupled in a forced manner with the steered vehicle wheels. The steered vehicle wheels are also connected to the drive with a motor-driven actuating unit, which is controlled as a function of forces or torques transmitted between the manual steering wheel and the steered vehicle wheels. For this purpose, parts, i.e., shaft parts, of the mechanical driving connection between the manual steering wheel and the steered vehicle wheels are resiliently connected with one another so that the parts or shaft parts carry out, corresponding to the respective active forces or torques, a substantial actuating stroke or a substantial rotation relative to one another. By means of this actuating stroke or this relative rotation, a servo valve is then operated which controls the hydraulic actuating unit.

Optionally, an electric actuating unit may be controlled by this actuating stroke or the relative rotation.

In the case of airplanes, it is known to connect tail units and wing flaps and the like with assigned manual devices only with respect to the operation by way of a control system. The manual device actuates a desired value generator and the wing flaps and the tail units actuate an actual value generator. The control device of the control system subsequently processes the signals of the desired value and actual value generator to effect a desired-value actual-value comparison and, as a function of the result of this comparison, controls motor-driven actuating units for the tail units and the wing flaps. This concept, which is also called "fly by wire", has become so reliable that even passenger planes have corresponding equipment.

In principle, it is also possible to provide comparable arrangements in the case of vehicle steering systems, as indicated in German Patent Document DE 42 321 256 A1, which shows a vehicle steering system of the initially mentioned type. According to the DE 42 32 256 A1, the control device is also capable of carrying out an autonomous steering intervention, for example, in order to counteract disturbances caused by cross wind.

Another steering system of the initially mentioned type is indicated in German Patent Document DE 42 07 719 A1.

In the case of steering systems of this type, the control device can also control a manual force actuating device so that to the driver feels a steering resistance at the manual steering device which changes according to the driving conditions. According to German Patent Document DE 42 32 256 A1, the manual force actuating device can be constructed as an electric motor or as a hydraulic unit. In connection with such a hydraulic unit, German Patent Document DE-42 07 719 indicates that the control device for controlling the hydraulic unit can operate a control valve.

European Patent Document EP 0 539 823 A1 shows a steering system of the initially mentioned type where a mechanical drive-through between the manual steering device and the steered vehicle wheels is not completely eliminated. However, it is only provided to switch the mechanical drive-through inoperative when the control system operates without errors in order to implement in the normal operation parameter-dependent steering kinematics which deviate from the mechanical drive-through. In contrast, in the case of disturbances in the control system, the mechanical drive-through is to become active.

From the printed document "Letters on Measuring Techniques 31 (1995)", Volume 1, Pages 13 to 18, wheel hubs with power sensors are known for measuring the strains on vehicles during operation and thus assist the design of chassis systems as well as proving stability when developing new vehicles.

From the journal *Automobil-Industrie* (1991), Volume 4/5, Pages 303 to 309, an electronic characteristic-diagram steering am system for utility vehicles is known. In this case, power assistance is changed as a function of parameters. Specifically, power assistance is changed as a function of forces and torques at vehicle wheels.

From the two latter documents, it is also known to monitor various force components separately.

German Patent Document DE 44 22 386 C1 relates to a power steering system with a reaction power controlled as a function of parameters, where this control can take place as a function of the signals of pressure sensors enabling the detection of forces which occur at the hydraulic servo motor.

The journal *Kraftfahrzeugtechnik* (1994), No. 11, Pages 36 to 38, shows active chassis systems, where the stability of the vehicle during steering maneuvers can also be increased by the automatic operation of the brakes of individual vehicle wheels as well as by the actuation of controllable spring or support assemblies.

It is an object of the invention to provide an advantageous arrangement for a steering system of the initially mentioned type.

According to the invention, this is achieved by connecting the control device to the input side with force or tension sensors on at least one wheel carrier of the steered vehicle wheels.

The invention is based on the general idea of sensing forces acting upon the steered vehicle wheels as directly as possible so that the control device can record the introduction of disturbance variables from the road by way of the steered vehicle wheels without any time delay, and examine its plausibility by means of other input quantities. This permits a multi-redundant system, where the redundant signals or the redundant information determined from the signals originate from differently structured and arranged sensors. There is also the advantageous possibility that, as a function of forces active on the steered vehicles wheels, the control device controls or influences a manual force actuator without delay. This has the purpose of simulating or modulating, as a function of the respective driving conditions, an actuating force on the manual steering device or on the manual steering wheel which can be felt by the driver.

On the whole, because of the invention, extraordinarily high control dynamics can be achieved because all forces acting upon the steered vehicle wheels can be "noticed" by the wheel-carrier-side sensors at the earliest possible point in time before, for example, a larger pressure change has occurred in a hydraulic actuating unit or a larger change of force has occurred in the case of an electric actuating unit, or the gearing elements between the steered vehicle wheels and the actuating unit have carried out recordable strokes or rotations.

Other objects, advantages and novel features of the present invention will become apparent from the following detailed description of the invention when considered in conjunction with he accompanying drawings.

DETAILED DESCRIPTION OF THE DRAWINGS

Figure 1:
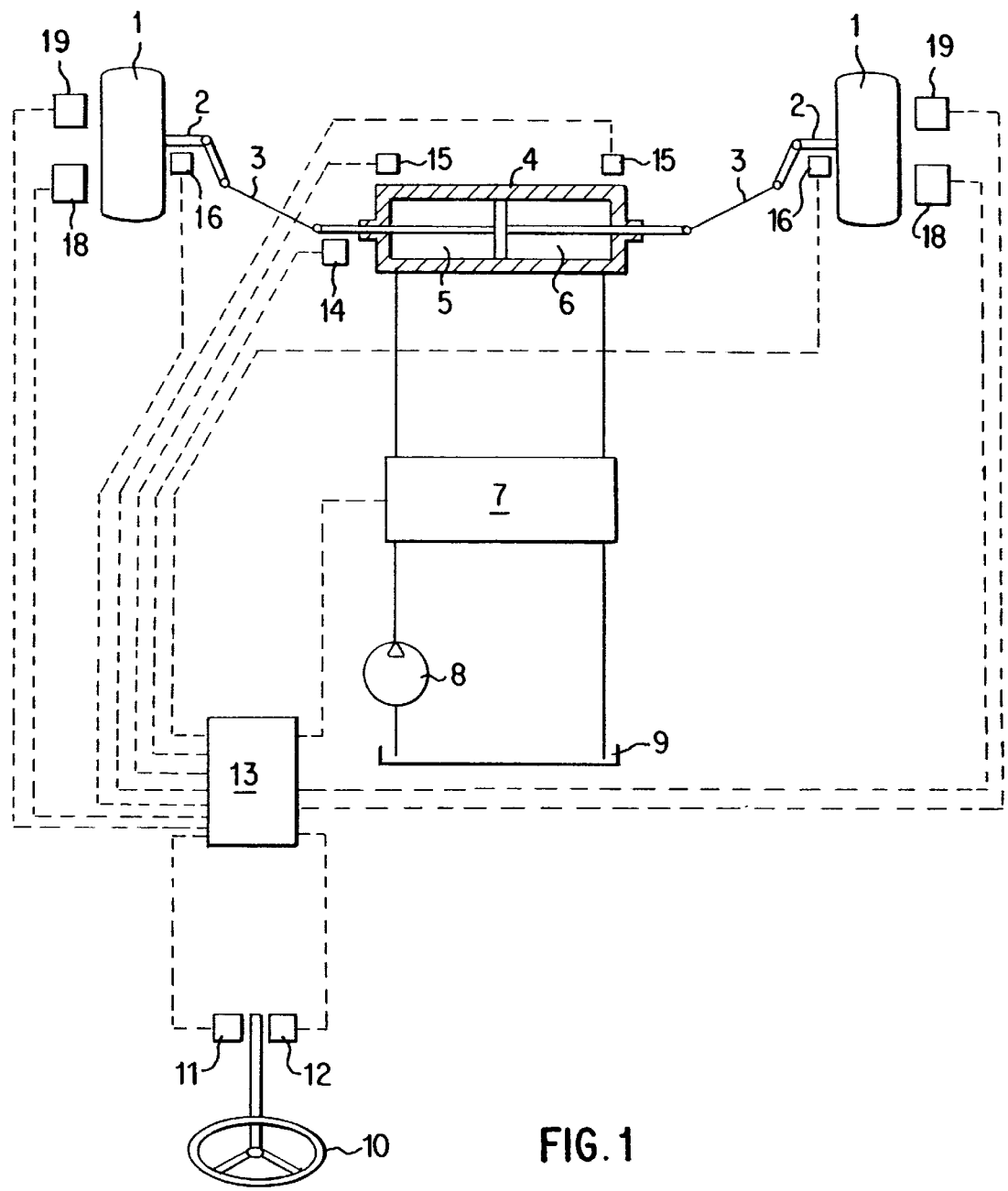
FIG. 1 is a wiring-diagram-type representation of a vehicle steering system according to the invention with a hydraulic actuating unit.

According to FIG. 1, a motor vehicle, which is otherwise not shown in detail has two steered vehicle wheels 1 which are each arranged on a wheel carrier 2. The wheel carrier 2, which is resiliently held on the vehicle body, and is for steering the steered vehicle wheels 1, can be swivelled about a vertical axis of the vehicle. By way of tie rods 3, the wheel carriers are connected with a hydraulic actuating unit 4 which, in the illustrated example, is constructed as a double-acting hydraulic piston-cylinder unit. The two hydraulic chambers of the actuating unit 4, which are separated from one another by the piston of the hydraulic actuating unit 4, can be connected by way of an electromagnetically operable control valve 7 with the pressure side of a hydraulic pressure source, in the illustrated embodiment, a hydraulic pump 8, or with a relatively pressureless hydraulic reservoir 9 with which the suction side of the hydraulic pump 8 also communicates. According to the position of the control valve 7, the hydraulic actuating unit 4 can generate an actuating force in one or the other direction or change or keep the adjusted position.

A manual steering wheel 10 operated by the driver is mechanically connected with respect to the drive with a desired-value generator 11, whose electric output signals represent the desired value of the steering angle of the steered vehicle wheels 1 or a quantity correlated thereto. It is also connectable to a manual force actuator 12 which controllably generates or modulates an actuating force which can be felt at the manual steering wheel 10. In this case, the manual force actuator 12 can be formed, for example, by a controllable electric motor which, according to the driving conditions, seeks to adjust the manual steering wheel 10 or to provide a resistance to an adjustment by the driver.

The manual force actuator 12, as well as the control valve 7, are operated by a computer 13 which operates in the manner of a control device and which, for this purpose, is connected on the input side with the desired-value generator 11 operated by the manual steering wheel 10 as well as with additional sensors which record the actual condition of system parts of the vehicle steering system.

In the illustrated embodiment, a path sensor 14 (actual value generator) determines the actuating stroke of the hydraulic actuating unit 4. Pressure sensors 15 determine the pressure in the hydraulic chambers 5 and 6 and the amount and direction of the pressure difference between the pressures in the above-mentioned chambers 5 and 6. Furthermore, sensor units 16 are in each case arranged on the wheel carriers 2 which record forces or mechanical tensions occurring at the respective wheel carrier 2. In this case, each sensor unit 16 preferably has several sensor elements which each react only to force or tension components and sense, for example, the normal wheel force, forces in the longitudinal direction of the vehicle or forces in the transverse direction of the vehicle and quantities correlated thereto.

Each sensor unit 16 can be constructed such that it is capable of determining the spatial direction of forces. For example, the sensor unit 16 can be formed by a so-called three-axis arrangement of wire strain gauges which are arranged on the wheel carrier 2 and are capable of separately sensing forces in the longitudinal, the transverse and the vertical direction. As a result, the normal wheel force can be determined in any driving condition with respect to the extent and the direction.

The signals of the sensors 14 to 16 supply multi-redundant information so that the computer 13 will be capable of determining possible defectively operating individual sensors. Furthermore, because of the sensor units 16, movements at the steered vehicle wheels 1 are sensed extremely early before, for example, the path sensor 14 is capable of recognizing an adjustment of the actuating unit 4, or the pressure sensors 15 are capable of recognizing a differential pressure and thus an actuating force which is active at the actuating unit 4.

In critical driving situations, for example, in cross winds, on icy roads, during obstacle avoidance maneuvers, which can be sensed by the corresponding sensors, the computer 13 can influence the steering (autonomous intervention) by a corresponding controlling of the control valve 7. Optionally, it can be provided that the computer 13 also carries out braking interventions 18 at individual wheels of the vehicle or at controllable spring and support assemblies 19 of the wheels. In this case, in addition to the normal wheel forces determined by means of the sensor units 16, additional quantities can also be taken into account (such as rotational speeds of the individual wheels, steering angles of the steered wheels or the path of the piston of the actuating unit 4, the lateral acceleration of the vehicle or the spring travels) if a corresponding sensing system exists and is connected with the computer 13. By means of the simultaneous and mutually coordinated computer-controlled operation of the steering system, the brakes, and the spring and support assemblies, a maximum of safety and comfort can be achieved for the driver.

Figure 2:
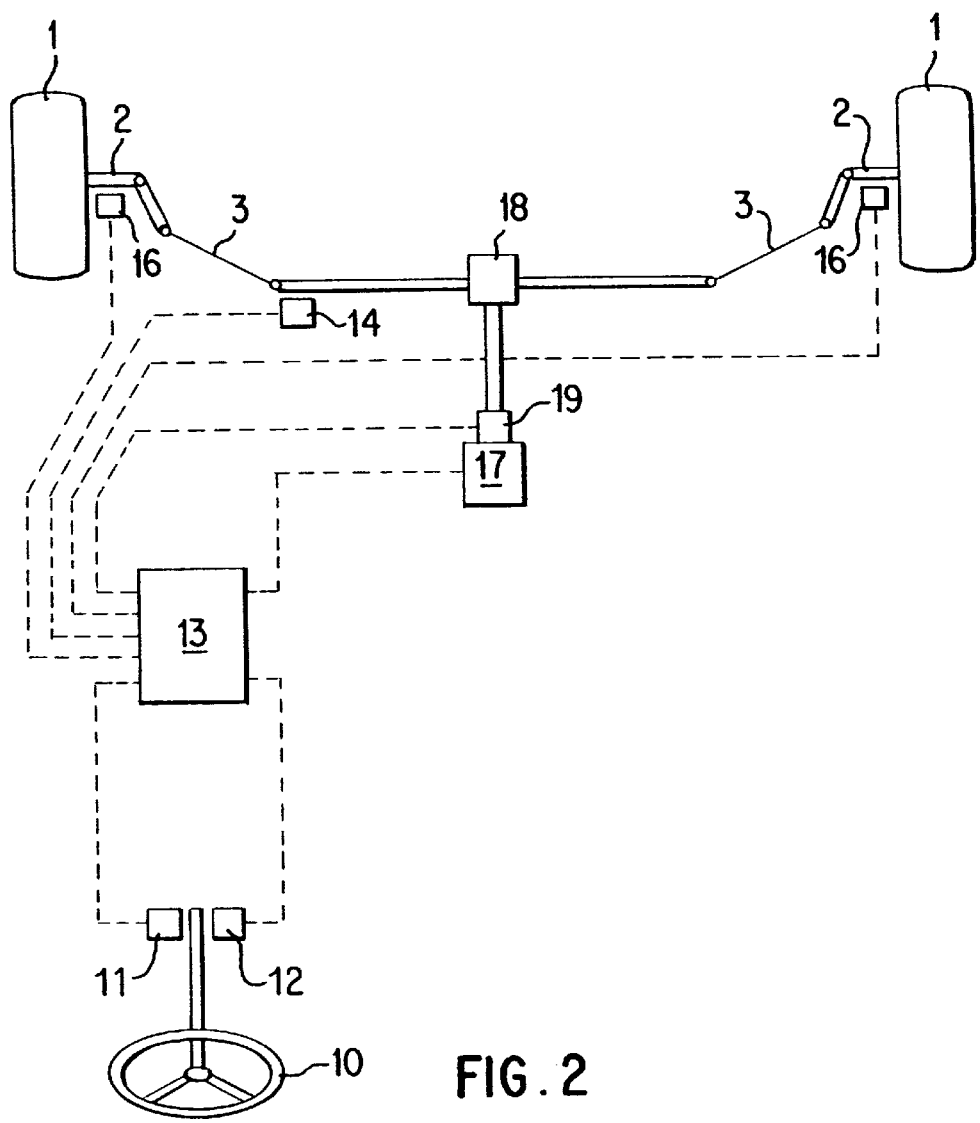
FIG. 2 is a corresponding representation of a vehicle steering system with an electric actuating unit.

The embodiment of FIG. 2 differs from the embodiment of FIG. 1 essentially because instead of a hydraulic actuating unit 4, an electric servo motor 17 is arranged which, by way of a gearing 18 such as a pinion and a toothed rack, is connected to the drive with the tie rods 3 and thus with the wheel carriers 2. Instead of the pressure sensors 15 provided in the case of the hydraulic actuating unit 4, a torque sensor 19 is provided which determines the torques active at the output of the servo motor 17. Alternatively, the forces in the toothed rack can also be determined by way of the torque of the pinion or the gearing 8 or the electric current consumption of the electric motor 17.

In the embodiment of FIG. 2, the computer 13, in addition to the manual force actuator 12, as also provided according to FIG. 1, controls the electric servo motor 17 as a function of the signals of the desired-value generator 11 as well as a function of the sensors or the sensor units 15, 16 and 19.

Figure 3:
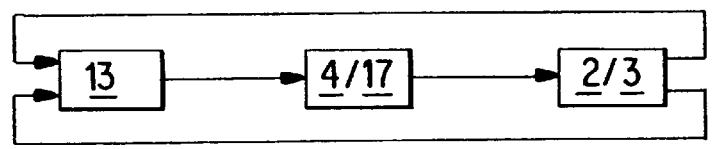
FIG. 3 is a schematic representation of the control system acting between the manual steering wheel and the steered vehicle wheels.

According to FIG. 3, the output signals of the computer 13 each directly or indirectly operate an actuating unit 4 or a servo motor 17. This operation causes an adjustment of the steered vehicle wheels 2 as well as an adjustment of transmission elements, such as tie rods that are arranged between the actuating unit 4 or the service motor 17 and the steered vehicle wheels 1 or their wheel carriers 2. This is "noticed" by the different sensors which operate as a function of the path and force and is "reported" to the computer 13.

The sensors 16 may be constructed, for example, in the manner of wire strain gauges.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering system in a vehicle having steered vehicle wheels mounted on wheel carriers, said steering system comprising:

a manually operable steering device;

an actuating unit coupled to actuate said steered vehicle wheels;

a control system operatively coupling said manually operable steering device with said actuating unit, the control system including a desired value generator operated by the manually operable steering device;

an actual value generator that records an actual steering angle of the steered vehicle wheels;

a plurality of sensors detecting forces in the vehicle steering system, including at least one force sensor coupled to at least one wheel carrier of the steered vehicle wheels to detect forces exerted from sources external to the vehicle; and a control device coupled to receive output signals from said desired value generator, said actual value generator and said at least one force sensor, said control device comprising control means for controlling said actuating unit as a function of said desired steering angle value, said actual steering angle and said forces which act on said at least one wheel carrier.

2. A vehicle steering system according to claim 1, wherein:

said actual value generator comprises a path sensor for determining a position of said actuating unit;

a plurality of additional sensors are provided which sense forces and torques active at the actuating unit; and outputs of said path sensor and said additional sensors are provided to said control device, and said control device uses said outputs for controlling said actuator.

3. A vehicle steering system according to claim 1 further comprising a manual force actuator coupled to receive output signals from said control device, said manual force actuator generating a steering resistance which can be felt at the manual steering device.

4. A vehicle steering system according to claim 2, wherein said at least one force sensor separately senses different force components acting on said at least one wheel carrier, including at least one of normal wheel forces, forces acting in a driving direction, and forces acting in a transverse direction of the vehicle.

5. A vehicle steering system according to claim 1, wherein the actuating unit is controlled by a control valve operated by the control device.

6. A vehicle steering system according to claim 1, wherein the first control device operates an electric servo motor.

7. A vehicle steering system according to claim 1, wherein the control device actuates wheel brakes.

8. A vehicle steering system according to claim 1, wherein the control device actuates controllable spring and support assemblies of the vehicle wheels.

9. A vehicle steering system according to claim 1, wherein the control device includes means for performing an autonomous intervention for controlling vehicle steering in response predetermined vehicle operating conditions.

* * * * *